US007061496B2

(12) United States Patent
Yi et al.

(10) Patent No.: US 7,061,496 B2
(45) Date of Patent: Jun. 13, 2006

(54) IMAGE DATA PROCESSING SYSTEM AND IMAGE DATA READING AND WRITING METHOD

(75) Inventors: Jong-Won Yi, Seoul (KR); Kyoung-Mook Lim, Yongin-shi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/795,677

(22) Filed: Mar. 8, 2004

(65) Prior Publication Data

US 2004/0212623 A1 Oct. 28, 2004

(30) Foreign Application Priority Data

Apr. 28, 2003 (KR) ...................... 10-2003-0026775

(51) Int. Cl.
*G09G 5/39* (2006.01)
*G09G 5/37* (2006.01)
*G06F 13/28* (2006.01)

(52) U.S. Cl. ....................... 345/531; 345/533; 345/562

(58) Field of Classification Search ................ 345/531, 345/537, 533, 562, 628; 711/5, 127, 157
See application file for complete search history.

(56) References Cited

U.S. PATENT DOCUMENTS

| | | | |
|---|---|---|---|
| 6,611,241 B1 * | 8/2003 | Firester et al. | 345/1.3 |
| 6,750,909 B1 * | 6/2004 | Tsai | 348/231.2 |
| 2004/0100577 A1 * | 5/2004 | Linzer et al. | 348/383 |

* cited by examiner

*Primary Examiner*—Kee M. Tung
*Assistant Examiner*—Hau Nguyen
(74) *Attorney, Agent, or Firm*—F. Chau & Associates, LLC

(57) ABSTRACT

An image data processing system with a memory performing burst read/write operations. The memory includes a memory cell array provided with memory cells arranged in a plurality of rows and a plurality of columns. The image data processing system further includes a controller for controlling an operation of reading/writing the image data from/to the memory. The controller divides the image data into a plurality of segments when a horizontal size of the image data is larger than a column width of the memory. An (I+1)-th (where I is a positive integer) segment includes a last burst data of an I-th segment, or the I-th segment includes a first burst data of the (I+1)-th segment. The respective segments correspond to the plurality of rows of the memory.

31 Claims, 8 Drawing Sheets

IMAGE DATA PROCESSING SYSTEM AND IMAGE DATA READING AND WRITING METHOD

BACKGROUND

1. Technical Field

The present disclosure relates to an image data processing system, and more particularly, to a method for reading/writing an image data from/to a memory in an image data processing system.

2. Discussion of Related Art

Image data processing technology is developing rapidly and research in moving images as well as still images has reached a remarkable level. In image data processing, an operation of accessing (reading/writing) image data from/to a memory is carried out frequently, and thus performance of an image data processing system depends on its ability to rapidly access a large amount of image data. Accordingly, as image data processing technology has advanced, attempts have been made to minimize degradation of performance caused by an increase in size of to-be-processed image data and more frequent reading/writing of image data from/to memory.

SUMMARY OF THE INVENTION

An image data processing system according to an embodiment of the invention includes a memory having a memory cell array provided with memory cells arranged in a plurality of rows and a plurality of columns. The memory performs burst read/write operations. Additionally, the image data processing system includes a controller for controlling an operation of reading/writing the image data from/to the memory. The controller divides the image data into a plurality of segments.

An (I+1)-th (where I is a positive integer) segment includes a last burst data of an I-th segment, or the I-th segment includes a first burst data of the (I+1)-th segment. The respective segments correspond to the plurality of rows of the memory.

In a preferred embodiment of the invention, the controller divides the image data into the plurality of segments when a horizontal size of the image data is larger than a column width of the memory.

In a preferred embodiment of the invention, the controller reads/writes the burst data from/to the row of the memory corresponding to the (I+1)-th segment of the image data when a start position of to-be-read/written burst data is included in the last burst data of the I-th segment. Additionally, the controller reads/writes the burst data from/to the row of the memory corresponding to the I-th segment of the image data when a start position of to-be-read/written burst data is included in the first burst data of the (I+1)-th segment.

In a preferred embodiment of the invention, a size of each segment is smaller than the column width of the memory.

In an embodiment of the present invention, the memory is a synchronous dynamic random access memory (SDRAM) and the controller is an SDRAM memory controller.

In an embodiment of the present invention, the memory has a single bank structure.

In another embodiment of the present invention, the memory has a multi bank structure containing k number of banks, where $k \geqq 2$. The controller stores k number of sequential lines of the image data in different banks of the memory.

In another embodiment of the present invention, the image data is divided into a plurality of segments to allow the memory to read/write the image data when a size of the horizontal data of the image data is larger than a column width of the memory accessing the burst data. An (I+1)-th segment (where I is a positive integer) includes a last burst data of an I-th segment, or the I-th segment includes a first burst data of the (I+1)-th segment. The segments correspond to the plurality of rows of the memory.

In another embodiment of the present invention, an image data processing system includes a plurality of memory cell array banks each being provided with memory cell arrays, each of the memory cell arrays containing memory cells arranged in a plurality of rows and a plurality of columns. Additionally, the image data processing system includes a controller for controlling an operation of reading/writing the image data from/to the memory. Adjacent lines of the image data correspond to different memory cell array banks.

In a preferred embodiment of the invention, the controller divides the image data into the plurality of segments, in which an (I+1)-th segment (where I is a positive integer) includes a last burst data of an I-th segment, or the I-th segment includes a first burst data of the (I+1)-th segment. The respective segments correspond to a plurality of rows of the memory.

In an embodiment of the present invention, the controller divides the image data into a plurality of segments when a horizontal size of the image data is larger than a column width of the memory.

In another embodiment of the present invention, an image data processing system includes a memory having a plurality of memory cell array banks each being provided with memory cell arrays, each of the memory cell arrays containing memory cells arranged in a plurality of rows and a plurality of columns. Additionally, the image data processing system includes a controller for controlling an operation of reading/writing the image data from/to the memory. The image data is divided into a plurality of segments, in which an (I+1)-th segment (where I is a positive integer) includes a last burst data of an I-th segment, or the I-th segment includes a first burst data of the (I+1)-th segment. Adjacent lines of the image data correspond to different memory cell array banks, respectively. The respective segments correspond to a plurality of rows of the corresponding memory cell array banks.

In a preferred embodiment of the invention, the controller divides the image data into the plurality of segments when a horizontal size of the image data is larger than a column width of the memory.

In an embodiment of the invention, the controller reads/writes the burst data from/to a row of a memory cell array bank corresponding to the (I+1)-th segment of the image data when a start position of to-be-read/written burst data is included in the last burst data of the I-th segment. Additionally, the controller reads/writes the burst data from/to a row of a memory cell array bank corresponding to the I-th segment of the image data when a start position of to-be-read/written burst data is included in the last burst data of the (I+1)-th segment.

A method for reading/writing image data according to an embodiment of the invention includes receiving a start position of to-be-read/written burst data, and reading/writing the burst data from/to a row of the memory corresponding to the (I+1)-th segment of the image data when the start position of the to-be-read/written burst data is included in the last burst data of the I-th segment. If a start position of the to-be-read/written burst data is included in the first burst data of the (I+1)-th segment, the burst data is read/written from/to the row corresponding to the I-th segment of the memory.

In a preferred embodiment of the invention, a horizontal size of the image data is larger than the column width of the memory accessing the burst data.

In an embodiment of the invention, a size of each segment is smaller than a column width of the memory.

In the image data processing system according to various exemplary embodiments of the invention, access to two rows does not occur during the burst read/write operations of the SDRAM. Therefore, the speed of the burst read/write operation to the image data is improved.

Further, a specific bank is activated by storing the sequential lines of the image data in different banks, so that other banks can be activated during the burst read/write operations. Therefore, an access speed of the SDRAM is improved.

A method of reading/writing image data from/to a memory according to another embodiment of the invention includes dividing the image data into a plurality of segments, an (I+1)-th (where I is a positive integer) segment including a last burst data of an I-th segment, the respective segments corresponding to a plurality of rows of the memory. A start position of to-be-read read/written burst data is received, and burst data is read/written from/to a row of the memory corresponding to the (I+1)-th segment of the image data when the start position of the to-be-read/written burst data is included in the last burst data of the I-th segment. In another embodiment of the invention, an I-th (where I is a positive integer) segment includes a first burst data of an (I+1)-th segment, and the burst data is read/written from/to a row of the memory corresponding to the I-th segment of the image data when the start position of the to-be-read/written burst data is included in the first burst data of the (I+1)-th segment.

BRIEF DESCRIPTION OF THE DRAWINGS

The present invention will become more apparent by describing in detail exemplary embodiments thereof with reference to the attached drawings in which.

DETAILED DESCRIPTION OF PREFERRED EMBODIMENTS

Reference will now be made in detail to preferred embodiments of the present invention, examples of which are illustrated in the accompanying drawings. However, the present invention is not limited to the embodiments illustrated hereinafter, and the embodiments herein are rather introduced to provide easy and complete understanding of the scope and spirit of the present invention.

Figure 1:
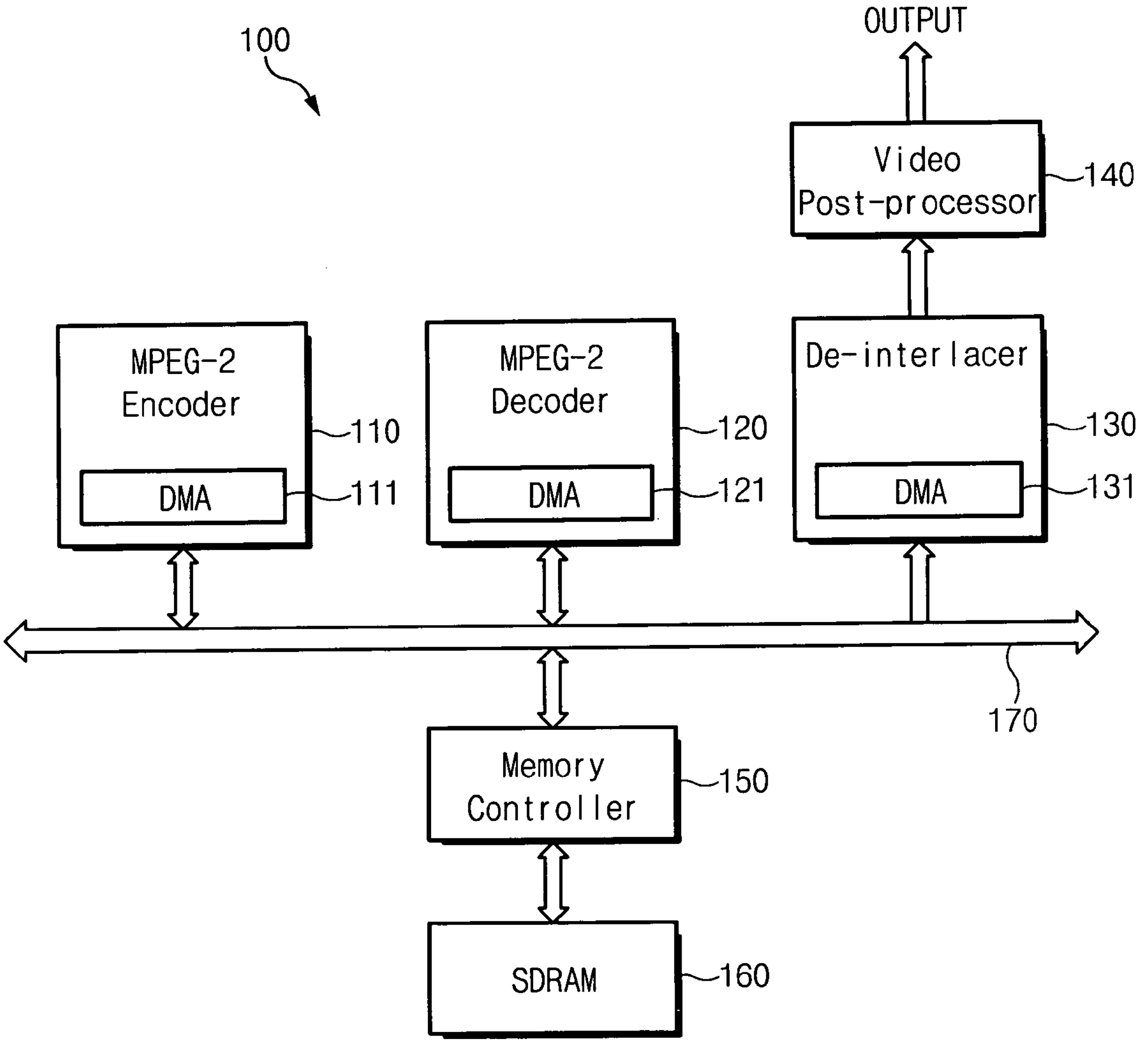
FIG. 1 is a block diagram of an image data processing system according to an embodiment of the present invention.

FIG. 1 is a block diagram of an image data processing system according to an embodiment of the present invention. Referring to FIG. 1, an image data processing system 100 includes a Moving Picture Experts Group Standards (MPEG)-2 encoder 110, an MPEG-2 decoder 120, a de-interlacer 130 and a video post-processor 140. The MPEG-2 encoder 110, the MPEG-2 decoder 120 and the de-interlacer 130 include direct memory access (DMA) controllers 111, 121 and 131, respectively, and are connected to a system bus 170. Additionally, the image data processing system 100 further includes a synchronous dynamic random access memory (SDRAM) 160 connected to the system bus 170 through a memory controller 150.

Figure 2:
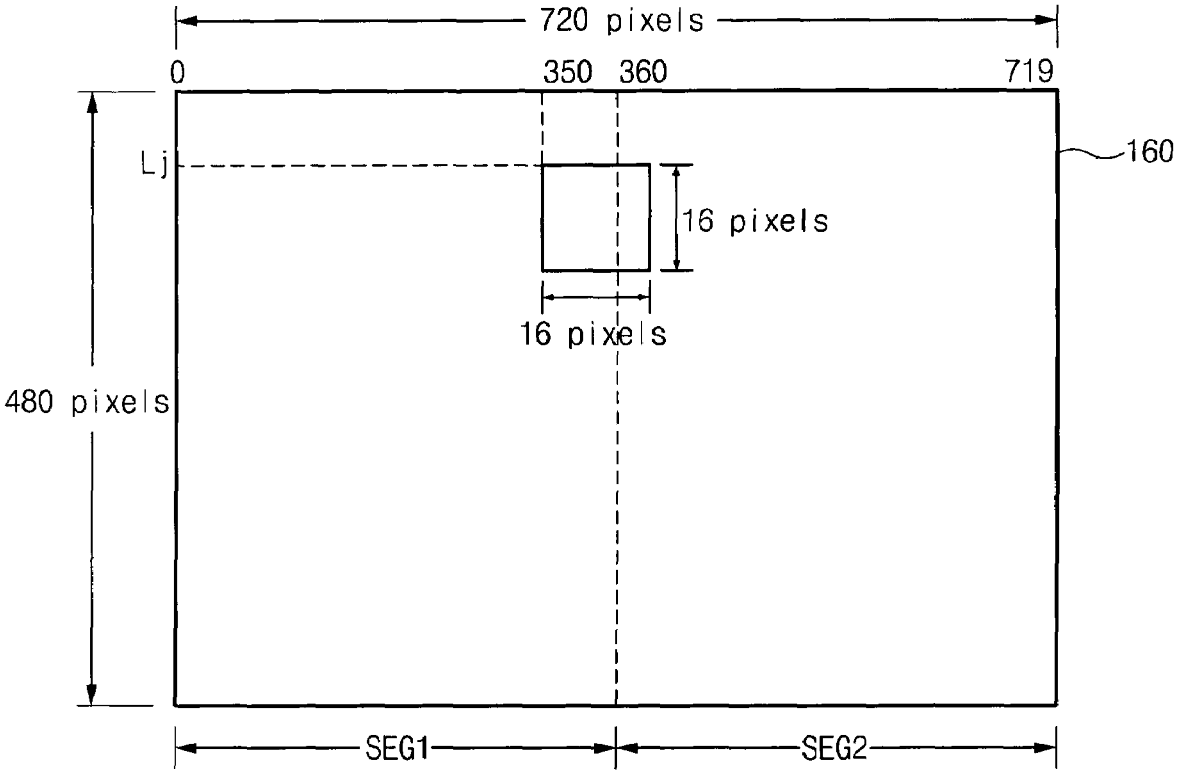
FIG. 2 is an exemplary diagram of image data processed in an MPEG-2 encoder, an MPEG-2 decoder and a de-interlacer.

FIG. 2 is an exemplary diagram of image data processed at the MPEG-2 encoder 110, the MPEG-2 decoder 120 and the de-interlacer 130. Resolution of the image data shown in FIG. 2 is 720×480. In other words, one image (frame) consists of 720 pixels in a horizontal direction and 480 pixels in a vertical direction. For example, there is 8 bits, i.e., 1 byte, of data per pixel. Therefore, horizontal size of the image data is given as follows:

$$720\times8 \text{ bits}=720\times1 \text{ byte}=720 \text{ bytes}$$

The SDRAM 160 of FIG. 1 includes a plurality of memory cells arranged in rows and columns. Generally, the SDRAM 160 includes 512×8 or 1024×8 memory cells in a column direction. In other words, column width of the SDRAM 160 is typically 512 bytes or 1024 bytes. Therefore, 512 pixel data can be stored in one row of the SDRAM 160. On the other hand, if the column width of the SDRAM 160 is 512 bytes, 720 pixel data should be separately stored in two rows of the SDRAM 160. As shown in FIG. 2, image data having a horizontal size of 720 bytes is divided into two segments SEG1 and SEG2, and the segments SEG1 and SEG2 included in one horizontal line are stored in two adjacent rows of the SDRAM 160. For example, 0th to 359th pixel data of j-th row Lj are stored in an m-th row of the SDRAM 160, and 360th to 719th pixel data of j-th row Lj are stored in an (m+1)-th row of the SDRAM 160.

As with conventional SDRAMs, the SDRAM 160 provides a burst access. In other words, if a row address and a column address are given from an external input, data read or write operation to sequential column addresses are performed at a high speed in synchronization with a clock signal. This is called a burst read or a burst write operation. A length of the sequential data outputted at that time, i.e., a burst length (BL), can be programmed in advance according to requirements of the system. In this embodiment, it is assumed that the burst data to be read/written according to a burst read/write command has a burst length of 16 bytes.

An exemplary read operation will be described with reference to FIG. 2 in which any one of the MPEG-2 encoder 110, the MPEG-2 decoder 120 and the de-interlacer 130 reads 16×16 pixel data from a pixel of the SDRAM 160 disposed at 350th column and j-th row Lj. In this example, when 0th to 359th pixel data of the j-th row Lj are stored in the m-th row of the SDRAM 160 and 360th to 719th pixel data of the j-th row Lj are stored in the (m+1)-th row of the SDRAM 160, two-stage burst read operation is performed when requesting a read operation to the pixel data disposed at the 350th column and the j-th row. In other words, the first read stage is performed to read 350th to 359th pixel data stored in the m-th row of the SDRAM 160. Thereafter, the second read stage is performed to read 360th to 365th pixel data stored in the (m+1)-th row of the SDRAM 160. Accordingly, a total of 32 burst read operations is required when reading 16×16 pixel data from the pixel disposed at the 350th column and the j-th row. The reason is that two burst read operations are performed to read pixel data of one row since 350th to 365th pixel data in the horizontal direction are separately stored in two adjacent rows. Additionally, a total of 32 burst write operations are required when writing to the SDRAM 160 16×16 pixel data from the pixel disposed at the 350th row and the j-th column.

Read/write time when burst data to be read/written from/to the SDRAM 160 is disposed on both the first and second segments SEG1 and SEG2 is twice as long as read/write time when reading/writing pixels disposed at either the first segment or the second segment. In order to solve the above problem, as shown in FIG. 3, according to an image data processing system 100 of an exemplary embodiment of the present invention, the second segment SEG2 overlaps last burst data of the first segment SEG1, or the first segment SEG1 overlaps first burst data of the second segment SEG2.

Figure 3:
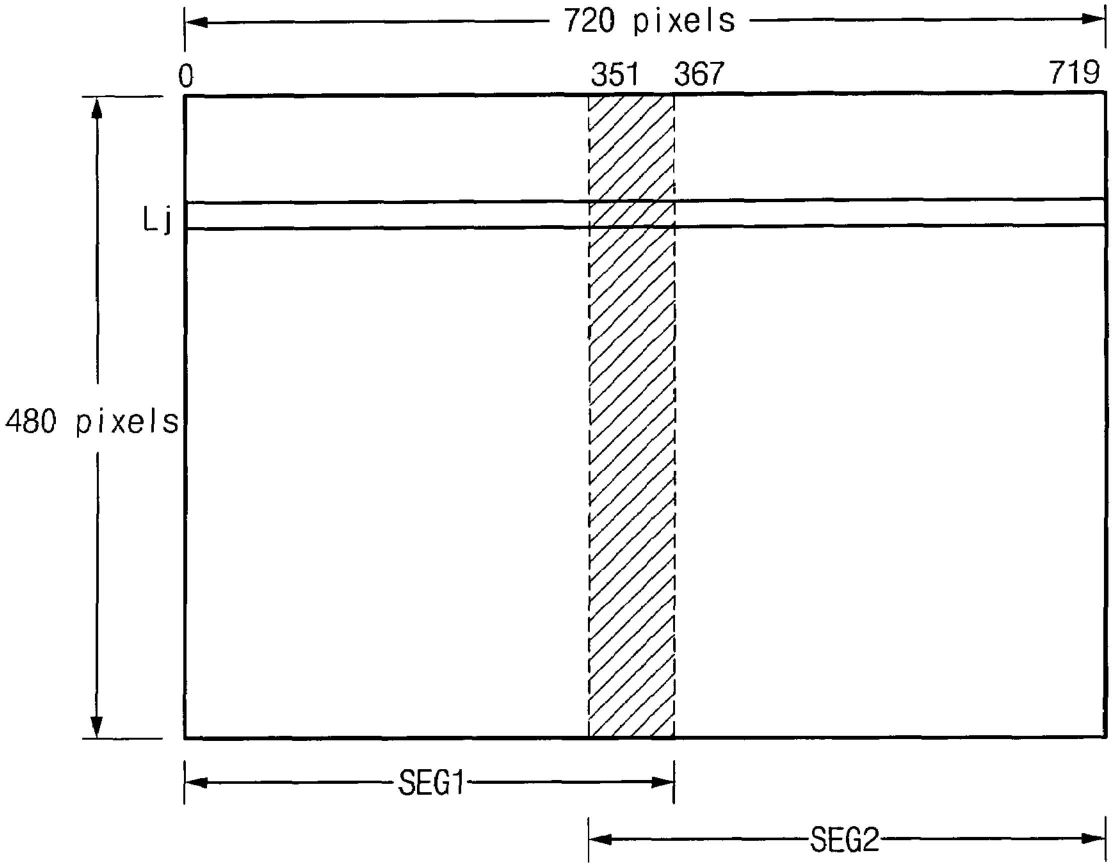
FIG. 3 shows a second segment of image data which overlaps and includes a last burst data of a first segment of the image data according to a an embodiment of the present invention.

Referring to FIG. 3, when image data having a horizontal size of 720 pixels (i.e., 720 bytes) and the SDRAM 160 has a column width of 512 bytes, the first segment SEG1 includes 368-byte pixel data corresponding to 0th to 367th pixels, and the second segment SEG2 includes 368-byte pixel data corresponding to 352nd to 719th pixels. Accordingly, 352nd to 367th pixels are overlapped in the first and second segments SEG1 and SEG2. In other words, the first and second segments SEG1 and SEG2 share 16-byte pixel data with each other.

FIGS. 4*a* to 4*d* show storing image data with various sizes in a SDRAM according to an exemplary embodiment of the present invention.

Figure 4A:
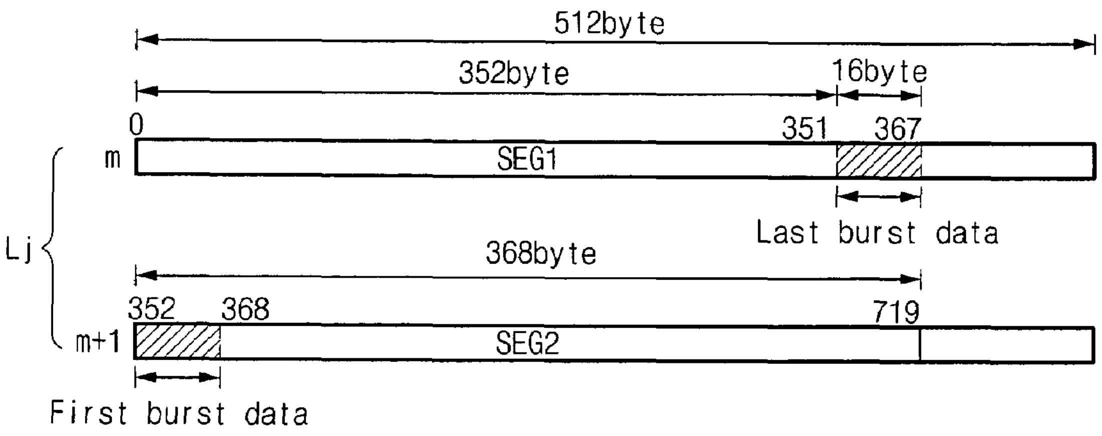
FIGS. 4*a* to 4*d* show storing image data with various sizes in a SDRAM according to an exemplary embodiment of the invention.

FIG. 4*a* shows the j-th line Lj of image data separately stored in two rows of the SDRAM 160 when a column width of the SDRAM 160 is 512 bytes and a horizontal size of the image data is 720 bytes. Referring to FIG. 4*a*, each of the first and second segments SEG1 and SEG2 has a horizontal size of 368 bytes. The m-th row of the SDRAM 160 stores the first segment SEG1 of the j-th line Lj of the image data, i.e., 0th to 367th pixel data, and the (m+1)-th row of the SDRAM 160 stores the second segment SEG2 of the j-th line Lj of the image data, i.e., 352nd to 719th pixel data. The 352nd to 367th pixel data corresponding to the last burst data of the first segment SEG1 overlaps the first burst data of the second segment SEG2.

Figure 4B:
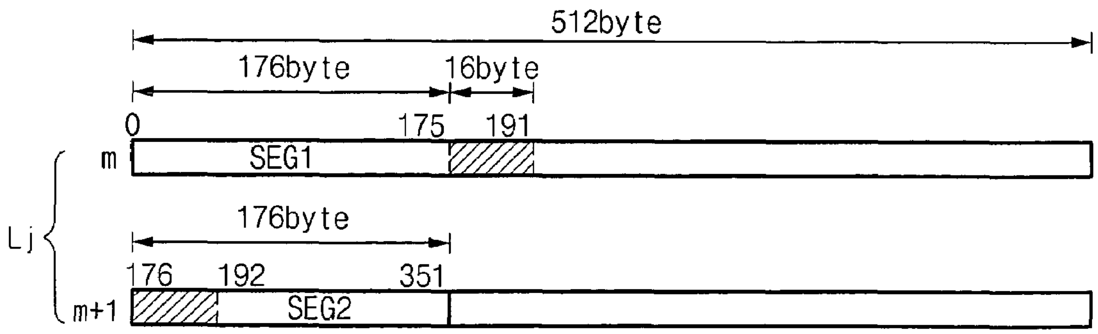

FIG. 4*b* shows one line of image data separately stored in two rows of the SDRAM 160 when a column width of the SDRAM 160 is 512 bytes and a horizontal size of the image data is 352 bytes. The first segment SEG1 includes 0th to 191st pixel data and corresponds to m-th row of the SDRAM 160. The second segment SEG2 includes 176th to 351st pixel data and corresponds to (m+1)-th row of the SDRAM 160. The $176^{th}$ to $191^{st}$ pixel data corresponding to the last burst data of the first segment SEG1 overlaps the first burst data of the second segment SEG2.

In case a horizontal size of the image data is smaller than a column width of the SDRAM 160 as shown in FIG. 4*b*, it is apparent that one line of the image data can be stored after being divided into a plurality of segments, and can also be stored without being divided.

Figure 4C:
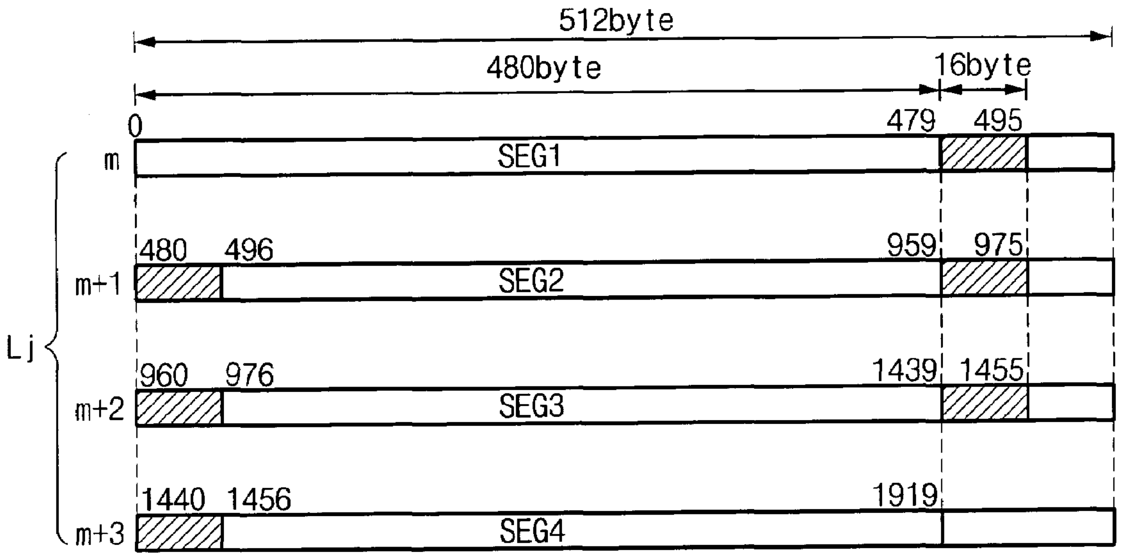

FIG. 4*c* shows one line of image data separately stored in four rows of the SDRAM 160 when a column width of the SDRAM 160 is 512 bytes and a horizontal size of the image data is 1920 bytes. A resolution of high definition television (HDTV) is 1920×1080. As shown in FIG. 4*c*, a first segment SEG1 includes 0th to 495th pixel data and corresponds to m-th row of the SDRAM 160, a second segment SEG2 includes 480th to 975th pixel data and corresponds to (m+1)-th row of the SDRAM 160, a third segment SEG3 includes 960th to 1455th pixel data and corresponds to (m+2)-th row of the SDRAM 160, and a fourth segment SEG4 includes 1440th to 1919th pixel data and corresponds to (m+3)-th row of the SDRAM 160. As in the above-described examples, the last burst data of the first segment SEG1 overlaps the first burst data of the second segment SEG2, the last burst data of the second segment SEG2 overlaps the first burst data of the third segment SEG3, and the last burst data of the third segment SEG3 overlaps the first burst data of the fourth segment SEG4.

Figure 4D:
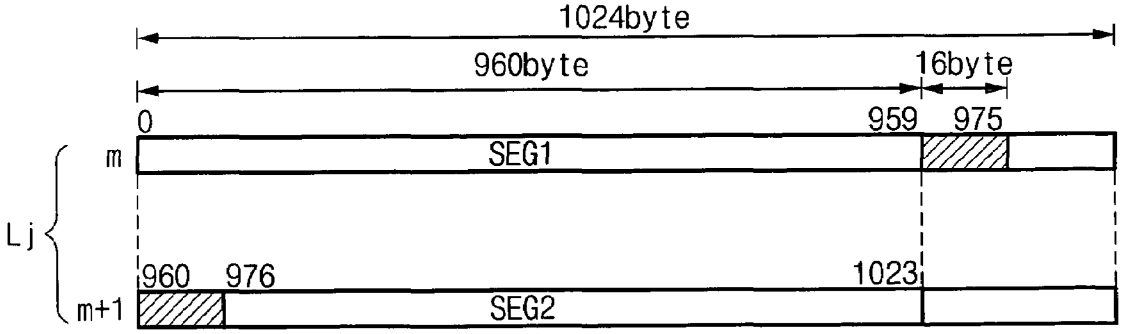

FIG. 4*d* shows one line of image data separately stored in two rows of the SDRAM 160 when a column width of the SDRAM 160 is 1024 bytes and a horizontal size of the image data is 1920 bytes. Referring to FIG. 4*d*, a first segment SEG1 includes 0th to 975th pixel data and corresponds to m-th row of the SDRAM 160, and a second segment SEG2 includes 960th to 1023rd pixel data and corresponds to (m+1)-th row of the SDRAM 160. The $960^{th}$ to $975^{th}$ pixel data corresponding to the last burst data of the first segment SEG1 overlaps the first burst data of the second segment SEG2.

Figure 5:
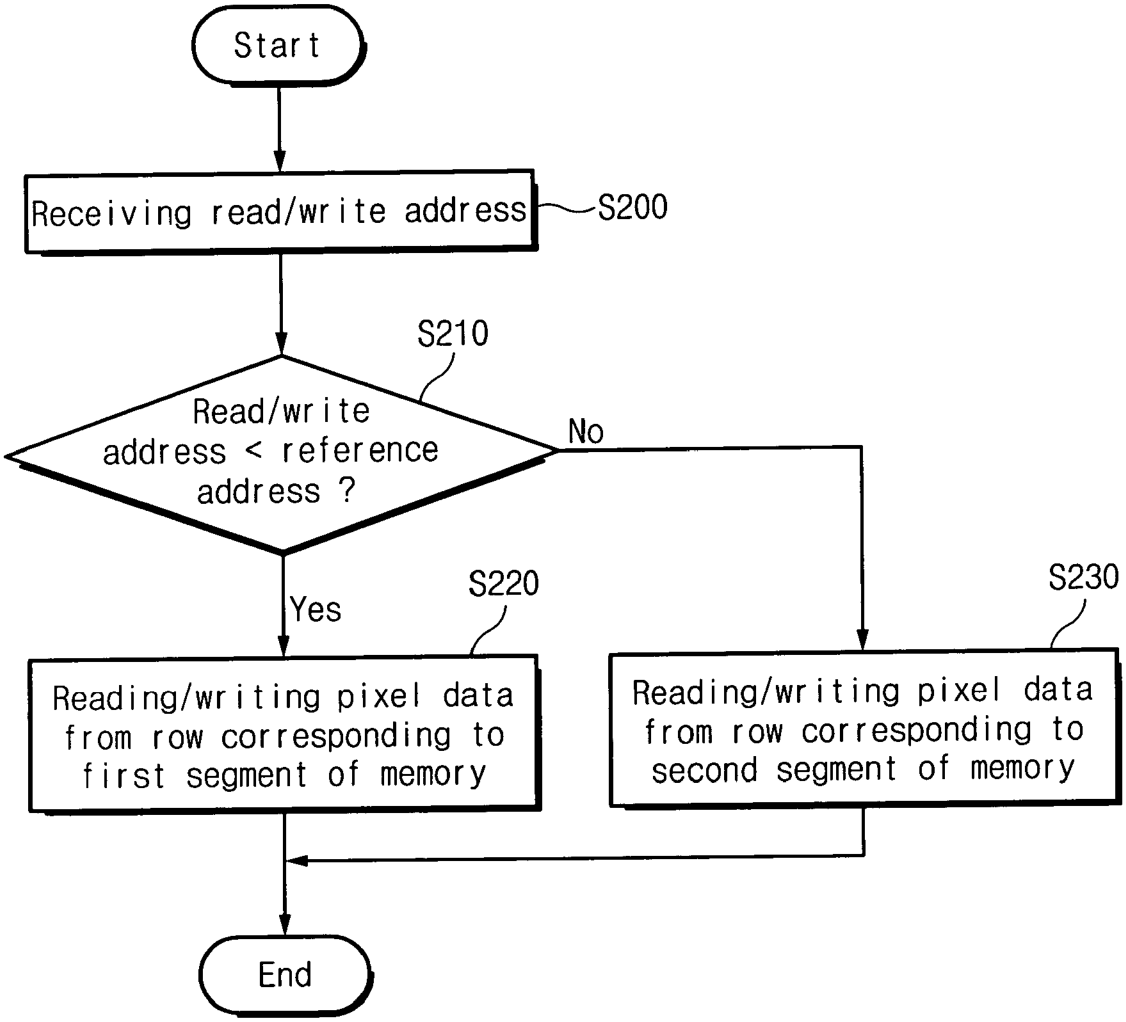
FIG. 5 is a flowchart showing control procedures of reading/writing data from/to a SDRAM at the memory controller of FIG. 1 according to an embodiment of the present invention.
Figure 6A:
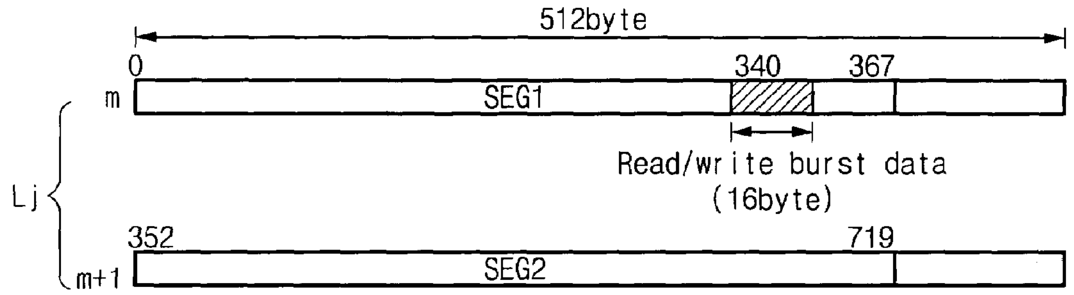
FIG. 6*a* is a diagram showing an operation of reading/writing 16-byte (340th to 356th) pixel data of j-th line of an image data from/to a SDRAM in response to a read/write command at a memory controller according to an embodiment of the invention.
Figure 6B:
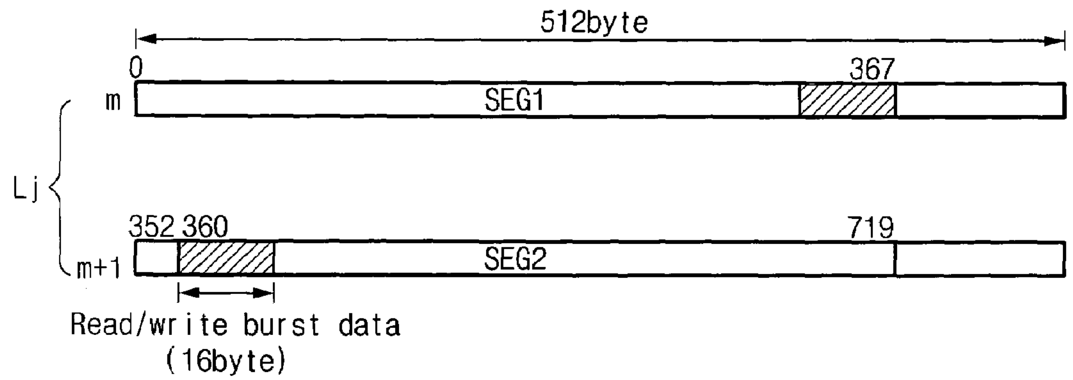
FIG. 6*b* is a diagram showing a process of reading/writing 16-byte (360th to 372nd) pixel data of j-th line of an image data from/to a SDRAM in response to a read/write command at a memory controller according to an embodiment of the invention.

FIG. 5 is a flowchart showing control procedures of reading/writing data from/to the SDRAM 160 at the memory controller of FIG. 1 according to a preferred embodiment of the present invention. FIGS. 6*a* and 6*b* illustrate states of read/write operations at the steps S220 and S230 of FIG. 5. Here, it is assumed that a column width of the SDRAM 160 is 512 bytes and a horizontal size of the image data is 720 bytes. Therefore, as shown in FIG. 4*a*, the j-th line Lj of the image data is divided into two segments SEG1 and SEG2 and stored in two rows, i.e., the m-th and (m+1)-th rows of the SDRAM 160, respectively. First, at step S200, the memory controller 150 receives a read/write address together with a read/write command from any one of the MPEG-2 encoder 110, the MPEG-2 decoder 120 and the de-interlacer 130 shown in FIG. 1. The read/write address indicates position of to-be-read/written pixel data, i.e., horizontal and vertical positions of the image data.

At step S210, the memory controller 150 compares the received read/write address with a reference address. If there is no special mention in the following explanation, the read/write address represents the horizontal position of the image data. If the read/write address is smaller than the reference address, the process proceeds to step S220, and if the read/write address is equal to or larger than the reference address, the process proceeds to step S230. Here, if the second segment SEG2 includes the last burst data of the first segment SEG1, the reference address is a start address of the last burst data of the first segment SEG1. Additionally, if the first segment SEG1 includes the first burst data of the second segment SEG2, the reference address is a start address of the first burst data of the second segment SEG2. In the example of FIG. 4*a*, the reference address is a start address of the last burst data of the first segment SEG1, i.e., an address of 352nd pixel data.

For example, in case the read/write address provided from any one of the MPEG-2 encoder 110, the MPEG-2 decoder 120 and the de-interlacer 130 indicates an image data disposed at the j-th row and the 340th column, the process proceeds to step S220 since the read/write address "340" is smaller than the start address "352" of the last burst data of the first segment SEG1.

Referring to FIG. 6*a*, at step S220, the memory controller 150 reads/writes the burst data from/to the m-th row corresponding to the first segment SEG1 among the m-th and (m+1)-th rows, which corresponds to the j-th line of the image data. Since size of data to be read/written from/to the SDRAM 160 in response to one read/write command is 16 bytes, the memory controller 150 reads/writes from/to the SDRAM 160 16-byte data corresponding to 340th to 356th pixels of the j-th line of the image data in response to the read/write command.

In another example, the read/write address provided from any one of the MPEG-2 encoder 110, the MPEG-2 decoder 120 and the de-interlacer 130 indicates image data disposed at the j-th row and the 360th column. Thus, the process proceeds to step S230 since the read/write address "360" is larger than the start address "352" of the last burst data of the first segment SEG1.

Referring to FIG. 6*b*, at the step S230, the memory controller 150 reads/writes burst data from/to the (m+1)-th row corresponding to the second segment SEG2 among the m-th and (m+1)-th rows, which correspond to the j-th line of the image data. Since size of data to be read/written from/to the SDRAM 160 in response to one read/write command is 16 bytes, the memory controller 150 reads/writes from/to the SDRAM 160 16-byte data corresponding to 360th to 372nd pixels of the j-th line of the image data in response to the read/write command.

In the above-described manner, the memory controller 150 reads/writes 16-byte burst data from/to the SDRAM 160 in response to one read/write command.

Accordingly, when a column width of the SDRAM 160 performing the burst access is larger than a horizontal size of the image data, access to two rows does not occur during the burst read/write operations even when one line of the image data is separately stored in two rows. Therefore, in spite of frequent burst read/write of the image data, degradation of speed does not occur.

As described above, when a column width of the SDRAM 160 performing the burst access is smaller than a horizontal size of the image data, one line of the image data is divided into a plurality of segments. Thereafter, an (I+1)-th segment (where I is a positive integer) includes a last burst data of an I-th segment, or the I-th segment includes a first burst data of the (I+1)-th segment. In other words, the last burst data of the I-th segment is overlapped by the first burst data of the (I+1)-th burst data. The respective segments correspond to a plurality of rows of the SDRAM 160.

The memory controller 150 reads/writes the burst data from/to the row corresponding to the (I+1)-th segment when a start point of the to-be-read/written burst data is included in the last burst data of the I-th segment. Accordingly, access to two rows does not occur during the burst read/write operations of the SDRAM 160. Consequently, the speed of burst read/write operation to the image data is improved.

According to various exemplary embodiments of the present invention, the memory controller 150 determines whether or not the column width of the SDRAM 160 performing the burst access is larger than the horizontal size of the image data, and one line of the image data is divided into a plurality of segments when the horizontal size of the image data is larger than the column width of the SDRAM 160. In order to use a general SDRAM and a general SDRAM memory controller in the image data processing system 100, the DMAs 111, 121 and 131 provided in the MPEG-2 encoder 110, the MPEG-2 decoder and the de-interlacer 130 are made to perform the above-described functions.

Figure 7A:
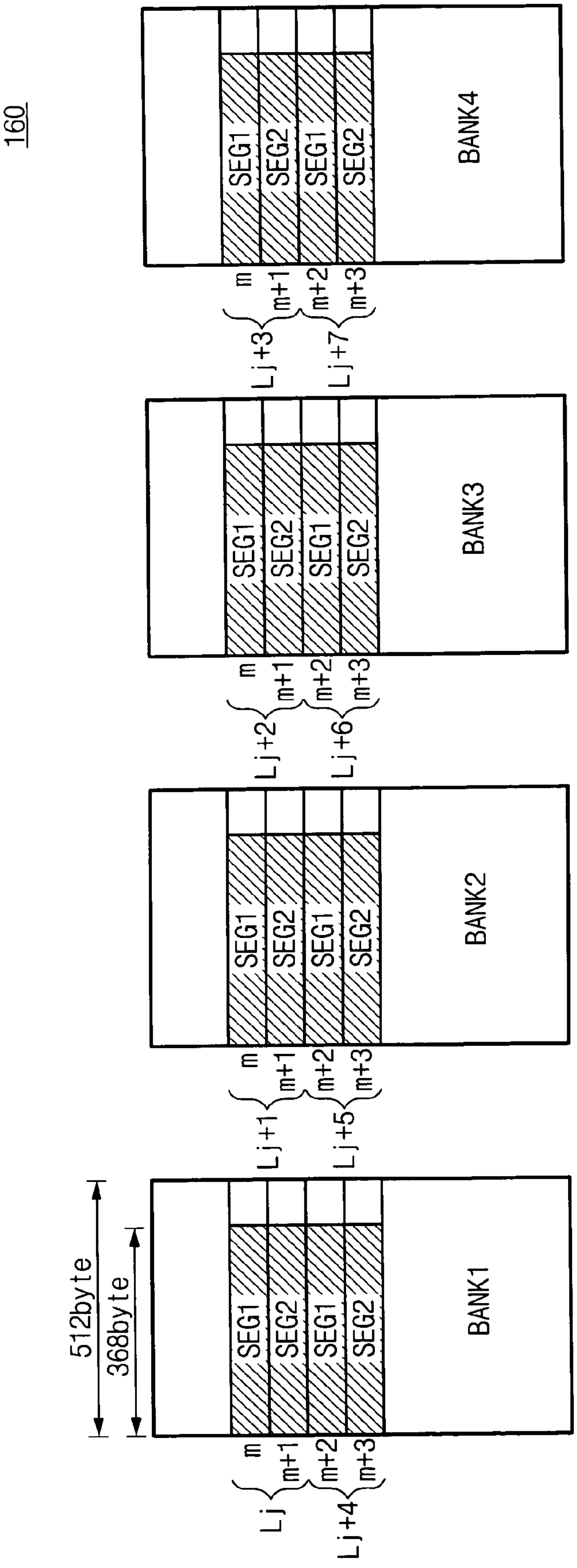
FIG. 7*a* is a diagram of image data stored in each bank of a SDRAM according to an embodiment of the present invention.
Figure 7B:
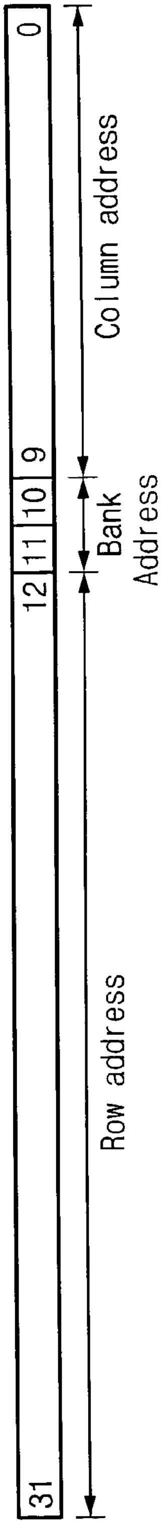
FIG. 7*b* illustrates addresses for accessing the SDRAM of FIG. 7*a*.

FIG. 7*a* is a diagram of image data stored in each bank of the SDRAM 160 according to a preferred embodiment of the present invention. The SDRAM 160 of FIG. 1 is configured with four banks, and FIG. 7*b* illustrates addresses for accessing the SDRAM 160 of FIG. 7*a*.

Referring to FIG. 7*a*, the SDRAM 160 is provided with four banks BANK1 to BANK4, each of which has a column width of 512 bytes. Each line of the image data is divided into two segments when a horizontal size of the image data is 720 bytes. The divided two segments are stored in two adjacent rows of each bank. For example, a j-th line Lj of the image data is divided into two segments SEG1 and SEG2, and the segments SEG1 and SEG2 are stored in m-th and (m+1)-th rows of the first bank BANK1, respectively. A (j+1)-th line Lj+1 of the image data is divided into two segments SEG1 and SEG2, and the segments SEG1 and SEG2 are stored in m-th and (m+1)-th rows of the second bank BANK2, respectively. A (j+2)-th line Lj+2 of the image data is divided into two segments SEG1 and SEG2, and the segments SEG1 and SEG2 are stored in m-th and (m+1)-th rows of the fourth bank BANK4, respectively. In the same manner, (j+4)-th to (j+7)-th lines Lj+4 to Lj+7 are stored in the first to fourth banks BANK1 to BANK4 of the SDRAM 160, respectively. Accordingly, sequential lines of the image data are stored in different banks.

In this manner, a specific bank is activated by storing the sequential lines of the image data in different banks, so that other banks can be activated during the burst read/write operations. Therefore, access speed of the SDRAM 160 is improved. Although the above-described embodiments of the present invention use a SDRAM as the memory, it should be understood that other kinds of memory devices that are capable of the image data processing and the burst read/write, such as, for example, flash memory, are also applicable.

According to various exemplary embodiments of the present invention, one line of the image data is divided into a plurality of segments, and the (I+1)-th segment (where I is a positive integer) includes the last burst data of the I-th segment, or the I-th segment includes the first burst data of the (I+1)-th segment. Additionally, the respective segments correspond to a plurality of rows of the SDRAM, so that access to two rows does not occur during the burst read/write operations of the SDRAM. Accordingly, the speed of burst read/write operation to the image data is improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An image data processing system comprising:

a memory including a memory cell array provided with memory cells arranged in a plurality of rows and a plurality of columns, the memory performing burst read/write operations; and a controller for controlling an operation of reading/writing the image data from/to the memory, the controller dividing the image data into a plurality of segments, an (I+1)-th (where I is a positive integer) segment including a last burst data of an I-th segment, the respective segments corresponding to the plurality of rows of the memory.

2. The image data processing system of claim 1, wherein the controller divides the image data into the plurality of segments when a horizontal size of the image data is larger than a column width of the memory.

3. The image data processing system of claim 2, wherein the controller reads/writes the burst data from/to the row corresponding to the (I+1)-th segment of the image data when a start position of to-be-read/written burst data is included in the last burst data of the I-th segment.

4. The image data processing system of claim 2, wherein a size of each segment is smaller than the column width of the memory.

5. The image data processing system of claim 2, wherein the memory is a synchronous dynamic random access memory (SDRAM).

6. The image data processing system of claim 5, wherein the controller is an SDRAM memory controller.

7. The image data processing system of claim 5, wherein the memory has a single bank structure.

8. The image data processing system of claim 5, wherein the memory has a multi bank structure containing K number of banks, where K≧2.

9. The image data processing system of claim 8, wherein the controller stores K number of sequential lines of the image data in different banks of the memory.

10. An image data processing system comprising:

a memory including a memory cell array provided with memory cells arranged in a plurality of rows and a plurality of columns, the memory performing burst read/write operations; and a controller for controlling an operation of reading/writing the image data from/to the memory, the controller dividing the image data into a plurality of segments, an I-th segment (where I is a positive integer) including a first burst data of an (I+1)-th segment, the respective segments corresponding to the plurality of rows of the memory.

11. The image data processing system of claim 10, wherein the controller divides the image data into the plurality of segments when a horizontal size of the image data is larger than a column width of the memory.

12. The image data processing system of claim 10, wherein the controller reads/writes the burst data from/to the row corresponding to the I-th segment of the image data when a start position of to-be-read/written burst data is included in the first burst data of the (I+1)-th segment.

13. The image data processing system of claim 10, wherein a size of each segment is smaller than the column width of the memory.

14. The image data processing system of claim 11, wherein the memory is a synchronous dynamic random access memory (SDRAM).

15. The image data processing system of claim 14, wherein the controller is an SDRAM memory controller.

16. The image data processing system of claim 14, wherein the memory has a single bank structure.

17. The image data processing system of claim 14, wherein the memory has a multi bank structure containing K number of banks, where K≧2.

18. The image data processing system of claim 17, wherein the controller stores K number of sequential lines of the image data in different banks of the memory.

19. An image data processing system comprising:

a memory including a plurality of memory cell array banks each being provided with memory cell arrays, each of the memory cell arrays containing memory cells arranged in a plurality of rows and a plurality of columns; and a controller for controlling an operation of reading/writing the image data from/to the memory, the controller dividing the image data into a plurality of segments when a horizontal size of the image data is larger than a column width of the memory, an (I+1)-th segment (where I is a positive integer) including a last burst data of an I-th segment, adjacent lines of the image data corresponding to different memory cell array banks, the respective segments corresponding to the plurality of rows of the corresponding memory cell array banks.

20. The image data processing system of claim 19, wherein the controller divides the image data into the plurality of segments when a horizontal size of the image data is larger than a column width of the memory.

21. The image data processing system of claim 19, wherein the controller reads/writes the burst data from/to a row of a memory cell array bank corresponding to the (I+1)-th segment of the image data when a start position of to-be-read/written burst data is included in the last burst data of the I-th segment.

22. The image data processing system of claim 19, wherein a size of each segment is smaller than the column width of the memory cell array bank.

23. The image data processing system of claim 19, wherein the memory is a synchronous dynamic random access memory (SDRAM).

24. A method for reading/writing image data, the image data being divided into a plurality of segments, an (I+1)-th segment (where I is a positive integer) including a last burst data of an I-th segment, the segments corresponding to a plurality of rows of a memory, the method comprising the steps of:

receiving a start position of to-be-read/written burst data; and reading/writing the burst data from/to a row of the memory corresponding to the (I+1)-th segment of the image data when the start position of the to-be-read/written burst data is included in the last burst data of the I-th segment.

25. The method of claim 24, wherein a horizontal size of the image data is larger than a column width of the memory.

26. The method of claim 24, wherein a size of each segment is smaller than a column width of the memory.

27. A method for reading/writing image data, the image data being divided into a plurality of segments, an I-th segment (where I is a positive integer) including a first burst data of an (I+1)-th segment, the segments corresponding to a plurality of rows of a memory, the method comprising the steps of:

receiving a start position of to-be-read/written burst data; and reading/writing the burst data from/to a row of the memory corresponding to the I-th segment of the image data when the start position of the to-be-read/written burst data is included in the first burst data of the (I+1)-th segment.

28. The method of claim 27, wherein a horizontal size of the image data is larger than a column width of the memory.

29. The method of claim 27, wherein a size of each segment is smaller than a column width of the memory.

30. A method of reading/writing image data from/to a memory, the memory performing burst read/write operations, the method comprising:

dividing the image data into a plurality of segments, an (I+1)-th (where I is a positive integer) segment including a last burst data of an I-th segment, the respective segments corresponding to a plurality of rows of the memory;

receiving a start position of to-be-read read/written burst data;

reading/writing the burst data from/to a row of the memory corresponding to the (I+1)-th segment of the image data when the start position of the to-be-read/written burst data is included in the last burst data of the I-th segment.

31. A method of reading/writing image data from/to a memory, the memory performing burst read/write operations, the method comprising:

dividing the image data into a plurality of segments, an I-th (where I is a positive integer) segment including a last burst data of an (I+1)-th segment, the respective segments corresponding to a plurality of rows of the memory;

receiving a start position of to-be-read read/written burst data;

reading/writing the burst data from/to a row of the memory corresponding to the I-th segment of the image data when the start position of the to-be-read/written burst data is included in the first burst data of the (I+1)-th segment.

* * * * *